(12) United States Patent
Kobayashi

(10) Patent No.: US 8,494,393 B2
(45) Date of Patent: Jul. 23, 2013

(54) INFORMATION PROCESSING APPARATUS, INFORMATION PROCESSING METHOD AND COMPUTER READABLE MEDIUM

(75) Inventor: Kunihiko Kobayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1329 days.

(21) Appl. No.: 11/907,805

(22) Filed: Oct. 17, 2007

(65) Prior Publication Data
US 2008/0192283 A1     Aug. 14, 2008

(30) Foreign Application Priority Data

Feb. 14, 2007  (JP) ................................. 2007-033068

(51) Int. Cl.
*G06F 3/147*   (2006.01)

(52) U.S. Cl.
USPC ............... 399/81; 399/82; 358/1.9; 358/1.16; 358/1.18

(58) Field of Classification Search
USPC ....................... 399/81, 82; 358/1.9, 1.16, 1.18
See application file for complete search history.

(56) References Cited

U.S. PATENT DOCUMENTS

| | | | |
|---|---|---|---|
| 6,795,663 B2 * | 9/2004 | Kato | 399/81 |
| 7,860,425 B2 * | 12/2010 | Mima et al. | 399/82 |
| 2002/0035627 A1 | 3/2002 | Sutou et al. | |
| 2004/0205570 A1 | 10/2004 | Tonomura | |
| 2006/0293765 A1 | 12/2006 | Tanaka et al. | |

FOREIGN PATENT DOCUMENTS

| | | |
|---|---|---|
| CN | 1343933 A | 4/2002 |
| JP | A-2000-313150 | 11/2000 |
| JP | A-2003-044318 | 2/2003 |
| JP | A-2003-256035 | 9/2003 |
| JP | A 2004-102365 | 4/2004 |
| JP | A-2004-110096 | 4/2004 |
| JP | A-2006-031722 | 2/2006 |
| JP | A-2007-001237 | 1/2007 |

OTHER PUBLICATIONS

Office Action issued in corresponding Chinese Application No. 200710186107.X, issued Jun. 28, 2010. (with English-language translation).

Aug. 30, 2011 Office Action issued in Japanese Patent Application No. 2007-033068 (w/ English Translation).

* cited by examiner

*Primary Examiner* — King Poon
*Assistant Examiner* — Lawrence Wills
(74) *Attorney, Agent, or Firm* — Oliff & Berridge, PLC

(57) ABSTRACT

An information processing apparatus includes: a display unit that displays a screen including at least one operation target item constituting a target of an operation; a recording unit that records pieces of information depicting operations performed by a user on operation target items displayed on the display unit as pieces of operation history information; and a screen reproducing unit that reproduces screens displayed at points in time at which the respective operations were performed on the basis of the pieces of operation history information recoded in the recording unit.

10 Claims, 8 Drawing Sheets

| IDENTIFIERS | DESIGNATION | COORDINATE INFORMATION | TYPES | DEFAULT |
|---|---|---|---|---|
| 10000 | COPY | (x, y)-(x, y) | TAB | ON |
| 11000 | ONE SIDE/ BOTH SIDES | (x, y)-(x, y) | RADIO BUTTON GROUP | "ONE SIDE→ ONE SIDE" |
| ... | ... | ... | ... | ... |

INFORMATION PROCESSING APPARATUS, INFORMATION PROCESSING METHOD AND COMPUTER READABLE MEDIUM

CROSS-REFERENCE TO RELATED APPLICATIONS

This application is based on and claims priority under 35 U.S.C. 119 from Japanese Patent Application No. 2007-0033068 filed Feb. 14, 2007.

BACKGROUND

1. Technical Field

The present invention relates to an information processing apparatus (hereinafter also simply referred to as an "information processor"), an information processing apparatus and a computer recording medium.

2. Related Art

In recent years, multifunction equipment has been widely used which provides functions of a copying machine, a facsimile (FAX) machine, a printing machine and the like in a multiple fashion. With the multifunction equipment, in some cases, the operation becomes complex due to the multiplicity of functions it provides.

SUMMARY

According to an aspect of the present invention, an information processing apparatus includes: a display unit that displays a screen including at least one operation target item constituting a target of an operation; a recording unit that records pieces of information depicting operations performed by a user on operation target items displayed on the display unit as pieces of operation history information; and a screen reproducing unit that reproduces screens displayed at points in time at which the respective operations were performed on the basis of the pieces of operation history information recoded in the recording unit.

BRIEF DESCRIPTION OF THE DRAWINGS

Exemplary embodiment of the present invention will be described in detail based on the following figures, wherein.

DETAILED DESCRIPTION

Figure 1:
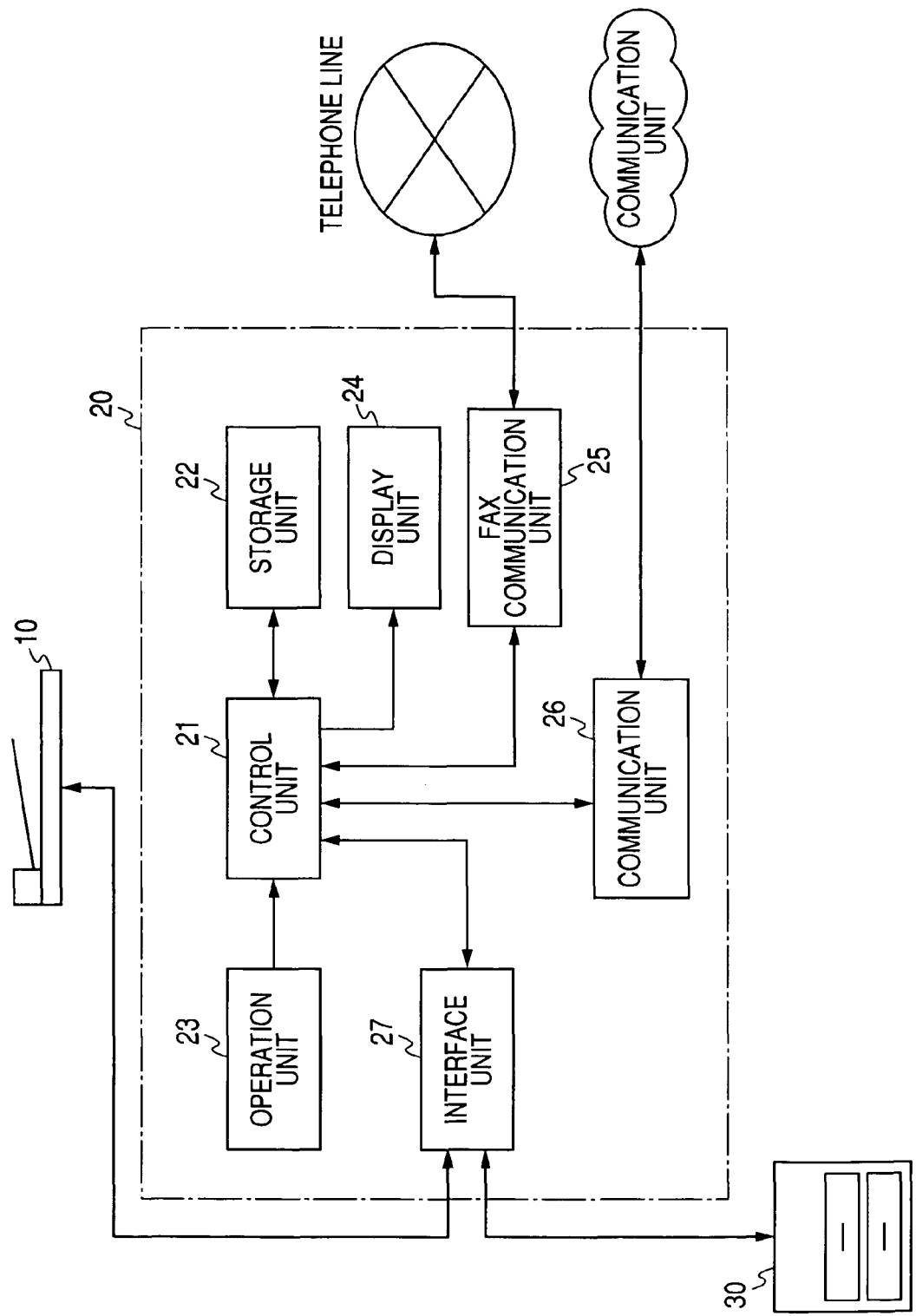
FIG. 1 is a configuration block diagram showing an example of an information processor according to an embodiment of the invention.

A mode for carrying out the invention will be described by reference to the drawings. An information processor 1 according to an embodiment of the invention is realized as multifunction equipment which includes functions of a copying machine, a facsimile machine, a printer and the like in a multiple fashion. The information processor 1 of the embodiment of the invention is configured to include, as is illustrated in FIG. 1, a scanner section 10, a controller section 20 and a printer section 30. In addition, the controller section 20 is configured to include a control unit 21, a storage unit 22, an operation unit 23, a display unit 24, a Fax communication unit 25, a communication unit 26 and an interface unit 27. Note that while the multifunction unit is described as an example of the information processor 1 here, the information processor 1 is not limited to such multifunction unit but may be a general computer unit which includes a personal computer or other various types of devices which are controlled by a computer.

The scanner section 10 is made up of, for example, a flatbed scanner and optically reads an original document which is placed to stay on an original document reading plane, so as to output image data obtained by scanning to the controller section 20.

The control unit 21 of the controller section 20 is a program control device such as a CPU and operates according to a program stored in the storage unit 22. As will be described later, software (a program) which describes steps to be executed by the control unit 21 can be provided in such a state that it is recorded on a magnetic tape, a magnetic disk, a flexible disk, an optical recording medium, a magneto-optical recording medium, a CD (Compact Disk), a DVD (Digital Versatile Disk), a semiconductor memory device, a bubble disk, and other computer-readable recording media such as means for recording information electrically, magnetically, optically or chemically. In addition, this program may be such as to be downloaded on various devices by way of a network such as the internet.

The control unit 21 performs an operation according to an instruction inputted through the operation of the operation unit 23 by the user. In addition, the control unit 21 stores operations performed by the user. Furthermore, the control unit 21 executes an operation for generating image data in which screens are reproduced which were displayed when the operations were performed by the user based on the records of the operations performed by the user. The detailed contents of these operations performed by the control unit 21 will be described later.

The storage unit 22 includes storage devices such as a RAM (Random Access Memory), a ROM (Read Only Memory) and the like. A program that is executed by the control unit 21 is held in this storage unit 22. In addition, the storage unit 22 also operates as a work memory of the control unit 21. Furthermore, the storage unit 22 may include a disk device such as a hard disk device, so that the records of the operations performed by the user or the like are held in the disk device. Here, the program stored in the storage unit 22 can be provided in such a state that it is recorded on a magnetic tape, a magnetic disk, a flexible disk, an optical recording medium, a magneto-optical recording medium, a CD (Compact Disk), a DVD (Digital Versatile Disk), a semiconductor memory device, a bubble disk, and other computer-readable recording media such as means for recording and reproducing information electrically, magnetically, optically or chemically. In addition, this program may be such as to be downloaded on various devices by way of a network such as the internet.

Figure 2:
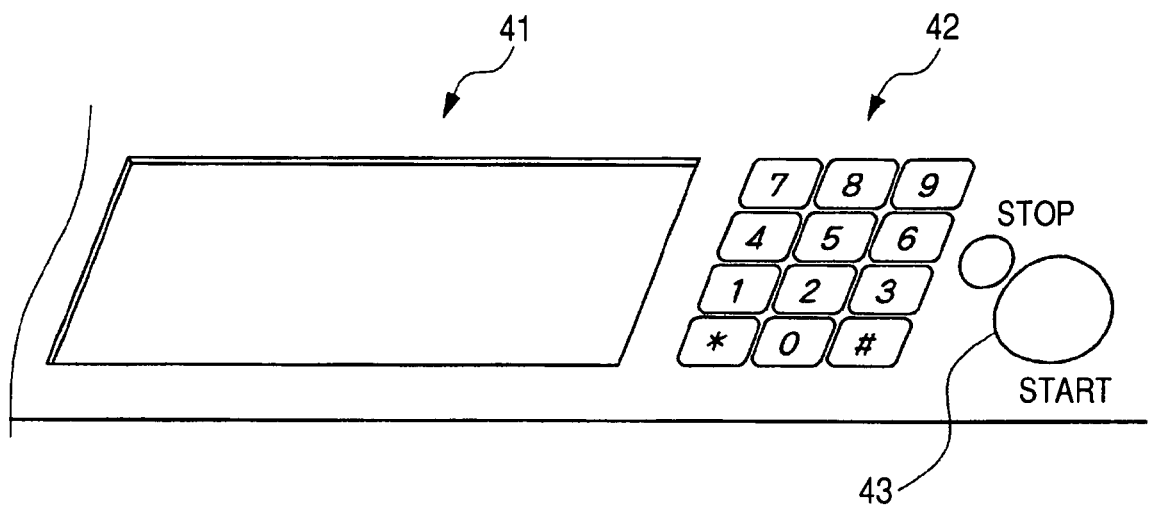
FIG. 2 is a schematic drawing depicting an example of an operation unit in the information processor according to the embodiment of the invention.

As is illustrated in FIG. 2, the operation unit 23 includes a touch panel 41 which includes a transparent electrode which is superposed on the display unit 24. In addition, this operation unit 23 may include buttons and switches (hardware keys) such as a ten key 42 and a start button in addition to the touch panel. The operation unit 23 outputs the contents of an operation performed by the user to the control unit 21.

The display unit 24 is made up of a liquid crystal panel or the like and displays a screen according to an instruction inputted from the control unit 21. Specifically displayed on the display unit 24 are operation target items as virtual buttons or the like which are visualized by the user through the transparent electrode of the touch panel. Items which are widely known as operation elements of a general graphical user interface can be used for the operation target items.

The FAX communication unit 25 is connected to a telephone line and calls a recipient of a transmission according to an instruction inputted from the control unit 21. This FAX communication unit 25 sends image data by employing a facsimile protocol when the recipient receives the transmission. In addition, when receiving image data via the telephone line, the FAX communication unit 25 outputs the image data so received to the control unit 21.

The communication unit 26 is such as to transmit or receive image data or the like via a communication means such as a network. This communication unit 26 sends information such as image data to a recipient of a transmission via the communication means according to an instruction inputted from the control unit 21. In addition, the communication unit 26 outputs information that is received thereby via the communication means to the control unit 21.

The interface unit 27 is connected to the scanner section 10 and the printer section 30. This interface unit 27 outputs image data inputted from the scanner section 10 to the control unit 21. In addition, the interface unit 27 transmits the image data which constitutes a target for image formation and parameter information related to printing such as the number of print copies of the image data to the printer section 30 according to an instruction inputted from the control unit 21.

The printer section 30 forms an image on a medium such as a sheet of paper based on parameter information and image data which are inputted from the control unit 21 via the interface unit 27.

Figure 3:
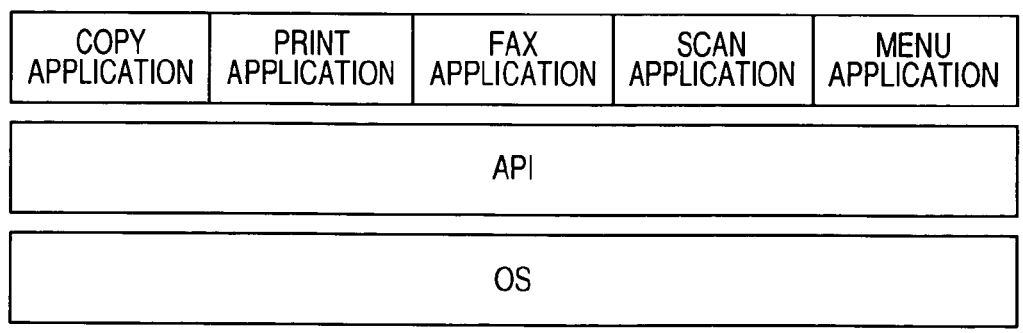
FIG. 3 is an explanatory drawing schematically depicting a functional configuration of the information processor according to the embodiment of the invention.

Here, operations which are executed by the control unit 21 of the embodiment will be described. As is illustrated conceptually in FIG. 3, this control unit 21 executes operations of an operating system (OS) which includes a memory control module and an application execution control module. In addition, the control unit 21 performs operations of an application interface module (API) in order to make use of functions of the operating system (OS). Each application program causes the display unit 24 to display an image thereon by making use of the API or receives the contents of an operation from the operation unit 23.

In this embodiment, software which realizes the respective functions of the multifunction equipment is stored in the storage unit 22 as application programs. In addition, software may also be stored in the storage unit 22 in which the control unit 21 is activated by a request from the application program, whereby an image in which virtual push buttons for accepting operations by the user are arrayed is displayed, and when the user presses down any of the pushbuttons, the control unit 21 provides the application program from which the request was originated with information which depicts which push button was pressed down.

Then, when the user activates a function through operation on a menu screen or the like, the execution of the application program which corresponds to the activated function is designed to be started. The operations by the control unit 21 do not have to be such as to include the applications by function and the operating system.

Figures 4A, 4B:
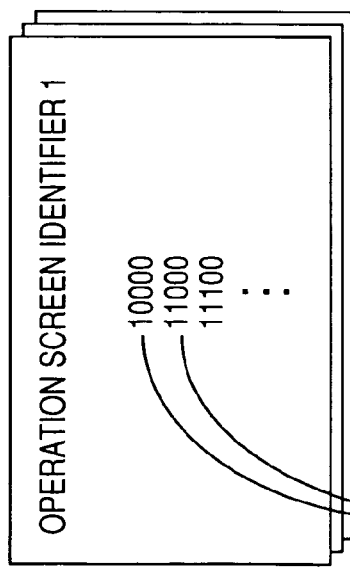
FIGS. 4A and 4B are explanatory drawings depicting an example of screen specifying information in the information processor according to the embodiment of the invention.

In addition, in this embodiment, stored in the storage unit 22 is screen specifying information which specifies a user interface screen which is to be displayed on the display unit 24 during execution of each application program. This screen specifying information is, as is illustrated, for example, in FIG. 4(a), information in which operation target items which are to be drawn as a user interface screen (an operation screen) are enumerated. Namely, pieces of information related to operation target items such as virtual buttons which are displayed on respective operation screens are enumerated in the order of drawing (that is, in the order of virtual closeness to the background) while associated with identifiers (screen identifiers) which are allocated individually to operation screens. Here, as the information related to operation target items, there is information on a specific identifier for each operation target item (referred to as an item identifier). As to the operation target items, a database related to operation target items is further held in the storage unit 22, and as is shown in FIG. 4(b), in the database, designation (title to be displayed), coordinate information which depicts a display range, information depicting states of the operation target items before operations are performed (information depicting default states) and the like are associated with item identifiers of the respective operation target items. Here, the coordinate information which depicts the range of display is information which defines a rectangular circumscribed about an operation target items, and in FIG. 4(b), as a specific example, a top left-hand side and bottom right-hand side coordinates of the rectangular are used.

Figure 5:
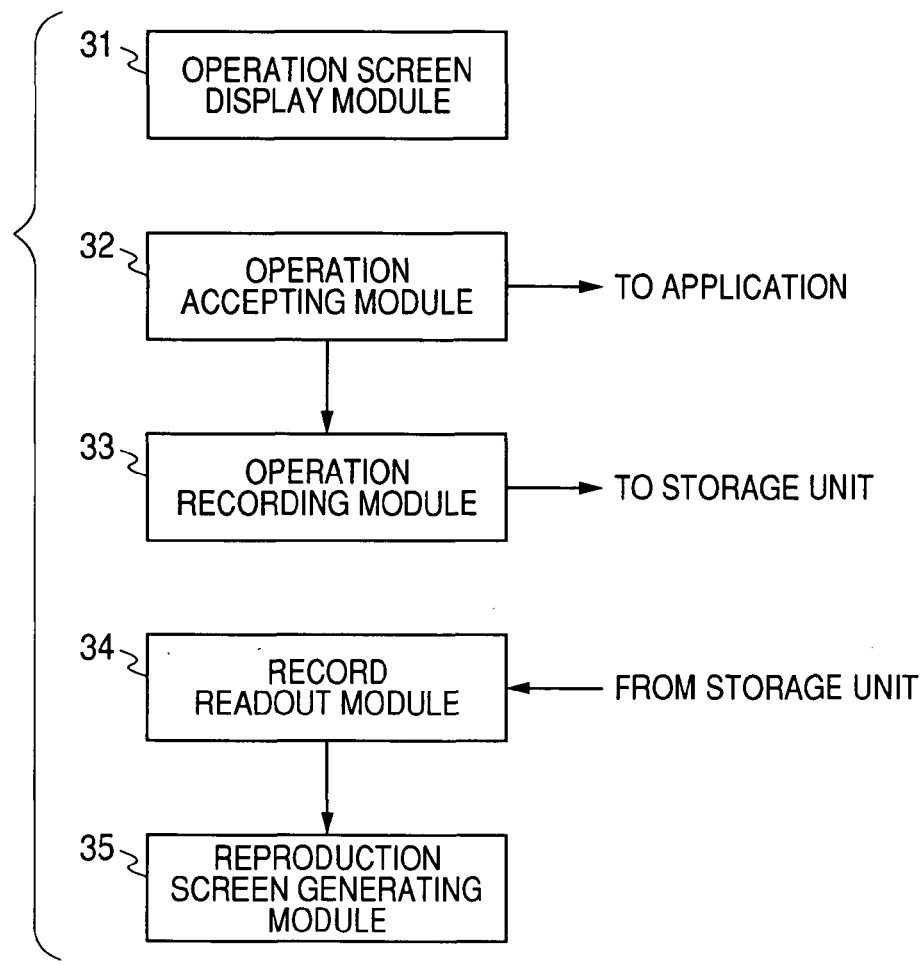
FIG. 5 is a functional block diagram depicting an example of the information processor according to the embodiment of the invention.

From the functional point of view, the control unit 21 of this embodiment is configured to include, as is shown in FIG. 5, an operation screen display module 31, an operation accepting module 32, an operation recording module 33, a record readout module 34 and a reproduction screen generating module 35.

The operation screen display module 31 displays an operation screen for accepting an operation from the user during execution of the application program. As this occurs, the operation screen display module 31 generates an operation screen which includes at least one operation target item which constitutes a target of an operation by referring to the information depicting a display target which is associated with a screen identifier for an operation screen which constitutes the target of the display and sets operation target items to default states which are depicted by the screen specifying information.

Namely, in this embodiment, image specifying information which specifies display positions of shapes and designations of tab, radio button, push button and the like is held in advance in the operating system. This image specifying information includes a plurality of images which are an image of, for example, a radio button which depicts a state before the button is pressed down for selection and an image of the radio button which depicts a state after the button is pressed down for selection.

In this embodiment, through the operation of the operating system, tabs and push buttons of a size instructed and a group of radio buttons which includes a designated number of radio buttons are drawn, and designations thereof are disposed accordingly. Let's take a push button for an example here. The external shape of the push button is drawn in a specified area specified by the coordinate information, and a character string depicting the designation of the push button is to be drawn in the center of the relevant area. In addition, receiving an input which depicts whether or not the push button is pressed down, the operating system reads out an image corresponding to the state depicted by the input, whereby a screen corresponding to the state is provided to be displayed.

In addition, in the case of radio buttons, a number of radio buttons which corresponds to the number of selection items which are to be selected by the radio buttons and designations of selection items are displayed while associated with each other (a list of radio buttons constituting a group of radio buttons). The user operates to select one selection item from the group.

Consequently, the operation screen display module 31 reads out the item identifier which is associated with the screen identifier which is selected as the target for display from the screen specifying information shown, for example, in FIG. 4. Next, the operation screen display module 31 refers to the designation which is associated with the item identifier so read out, information on type and coordinate information and instructs the operating system to draw an image depicted by the type information in a position on the screen which is designated by the coordinate information. In addition, the operation screen display module 31 instructs the operating system to display the screen on which the image has been so drawn. Then, the operating system outputs the screen so drawn to the display unit 24 for display thereon.

In addition, in the event that an interface program, which is different from the application program under execution, is separately activated in order to accept an operation by the user, the operation screen display module 31 is expected to generate an operation screen according to the instruction of the relevant interface program.

In this case, too, an item identifier associated with a screen identifier displayed by the interface program is read out from the screen specifying information. Next, the operation screen display module 31 refers to the designation which is associated with the item identifier so read out, information on type and coordinate information and instructs the operating system to draw an image depicted by the type information in a position on the screen which is designated by the coordinate information. In addition, the operation screen display module 31 instructs the operating system to display the screen on which the image has been so drawn. Then, the operating system outputs the screen so drawn to the display unit 24 for display thereon.

The operation accepting module 32 accepts an operation performed by the user on an operation screen displayed and transmits the contents of the operation so accepted to the application program (in the event that the interface program is activated, to the application program which has activated the relevant interface program). In addition, the operation accepting module 32 outputs information which depicts the contents of the operation to the operation recording module 33.

As a specific example, the user designates the application program to be activated such as copying or facsimile transmission and then starts the operation of the information processor 1. Then, the user performs operations for various types of settings and instructs the processor to start its operation by pressing down the start button or the like thereafter, ending the operation.

The operation accepting module 32 transmits an item identifier for an operation target item which is an operation target for the series of operations performed by the user and information which depicts the contents of the operations to the application program and the operation recording module 33. Here, the information which depicts the contents of the operations is, for example, information which depicts "Item identifier 1, Press down" in the case of a press-down operation of the item identifier "1" and information which depicts "Item identifier X, On" or "Item identifier X, Off" in the case of an operation for changing the states (on/off) of a check box or the radio button.

In addition, the operation accepting module 32 transmits an instruction to start the operation to the application program, when an operation to instruct the start of the operation is performed. The operation accepting module 32 stores information which depicts states of the respective operation target items at this point in time in the storage unit 22 as an operation record (an operation log) while associating the information with a screen identifier for the operation screen and item identifiers for the respective operation target items.

The application program identifies what sort of setting the user performed by employing the information sent from the operation accepting module 32 which depicts the states of the respective item identifiers and executes the operation according to the setting made by the user.

Figure 7:
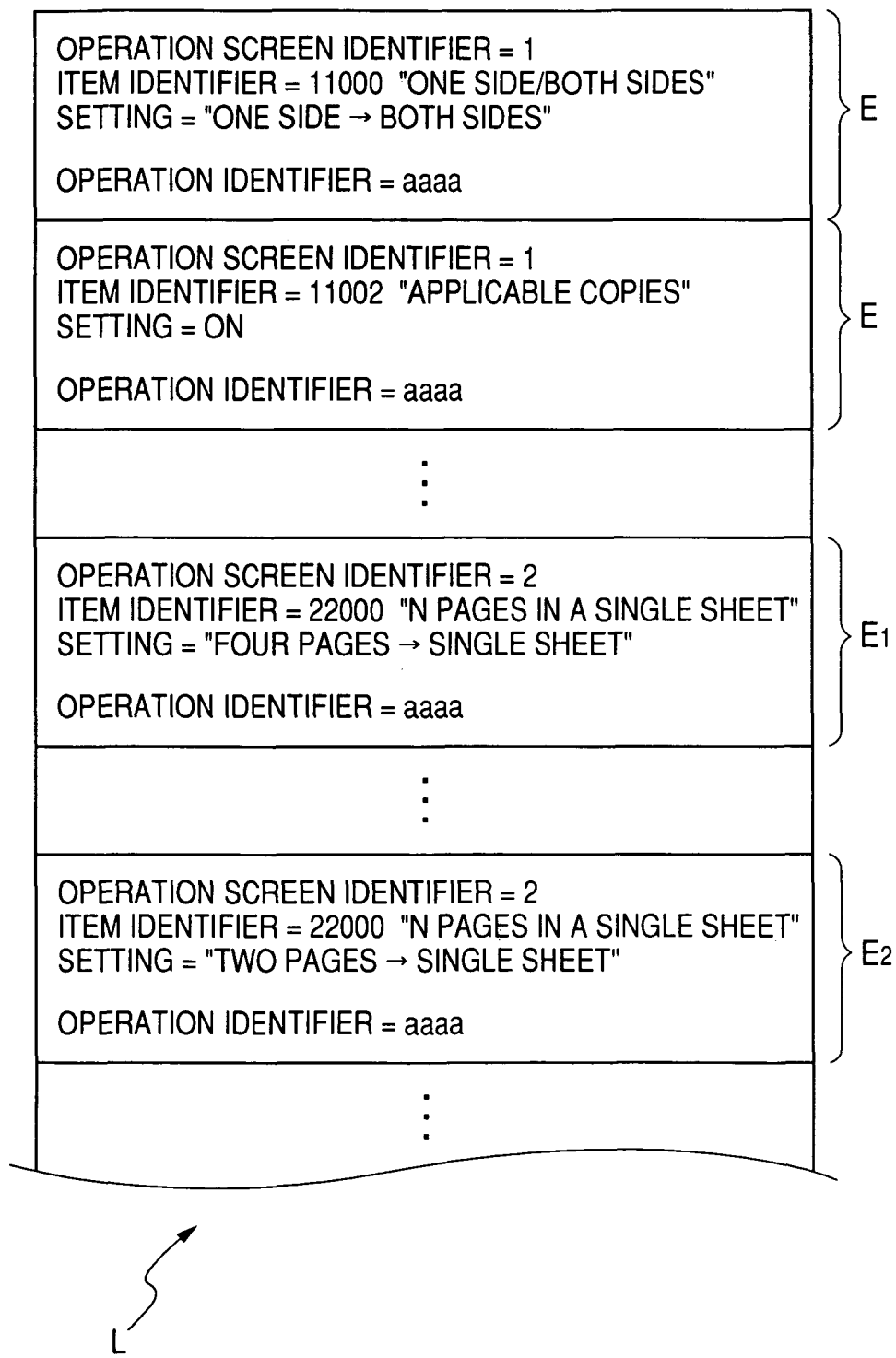
FIG. 7 is an explanatory drawing depicting an example of operation history information which is recorded in the image processor according to the embodiment of the invention.

The operation recording module 33 generates information in which the screen identifier of the operation screen on which the user performed the operation is associated with the information which depicts the contents of the operation. This information is information which depicts respective stages of the series of operations performed by the user and will be referred hereinafter to as an operation entry. Namely, this operation entry becomes, as is shown in FIG. 7, an entry (E) in which the operation screen identifier, the item identifier and the result of the operation performed (information depicting whether the operation target item is on or off and the setting of a character string which denotes an option selected) are associated with each other.

The operation recording module 33 generates an operation entry (E) like this every time an operation performed by the user is accepted by the operation accepting module 32, so as to be accumulated and stored in the storage unit 22. As a result, operation history information on which such an operation entry (E) is recorded is stored in the storage unit 22 in the order in which operations were performed. This operation history information includes a list (L) of operation entries.

The record readout module 34 reads out the operation history information stored in the operation recording module 33. Although the record readout module 34 may be configured to read out the whole of the operation history information or all the pieces of operation history information, the record readout module 34 may be configured to read out selectively the operation entry (E) which satisfies a predetermined condition. For example, in the event that the preceding operation is cancelled by the following operation, the pieces of operation history information are read out except for the respective operation entries (E) related to the preceding operation and the following operation which cancels the preceding operation. In addition, in the event that there is the operation in which the operation screen associated with the operation is determined in advance not to be reproduced, a flag to the effect that the operation screen is not to be read out for the relevant operation may be included to be recorded in the operation entry (E). In this case, the record readout module 34 controls such that the operation entry which includes the flag to that effect is not read out. The contents of this specific operation of the record readout module 34 will be described in detail later.

The reproduction screen generating module 35 generates image data on operation screens which were displayed at the time of performing the respective operations based on the operation entries (E) contained in the pieces of operation history information read out by the record readout module 34. Namely, the reproduction screen generating module 35 selects one operation entry (E) from the pieces of operation history information read out by the record readout module 34. Then, by referring to the screen identifier contained in the selected operation entry (E), the reproduction screen generating module 35 reads out the piece of information on the display target which is associated with the screen identifier from the storage unit 22.

The reproduction screen generating module 35 generates image data of the operation screen related to the selected operation entry (E) based on the piece of information related to the display target read out from the storage unit 22 and stores the image data so generated in the storage unit 22.

In addition, the reproduction screen generating module 35 may be made to perform a predetermined image processing on the generated image data so as to realize a form in which an image portion of the operation target item (an attentional operation target) which is identified by the item identifier contained in the selected operation entry (E) of the generated image data can be distinguished from image portions of other operation target items in the selected operation entry (E) on which operations have not yet been performed. As this image processing, for example, an operation is to be performed in which a graphic which surrounds the attentional operation target image is drawn in such a manner as to be superposed thereon.

As a specific example of the processing, the reproduction screen generating module 35 reads out information which defines a rectangular which is circumscribed about the attentional operation target from the screen specifying information. Then, a circle which circumscribes the circumscribed rectangular that is defined by the information so read out is drawn in such a manner as to be superposed on the generated image data. In addition, the lightness of pixels lying on the outside of the circumscribed rectangular defined by the information read out may be made to be decreased by a predetermined value.

Figure 6:
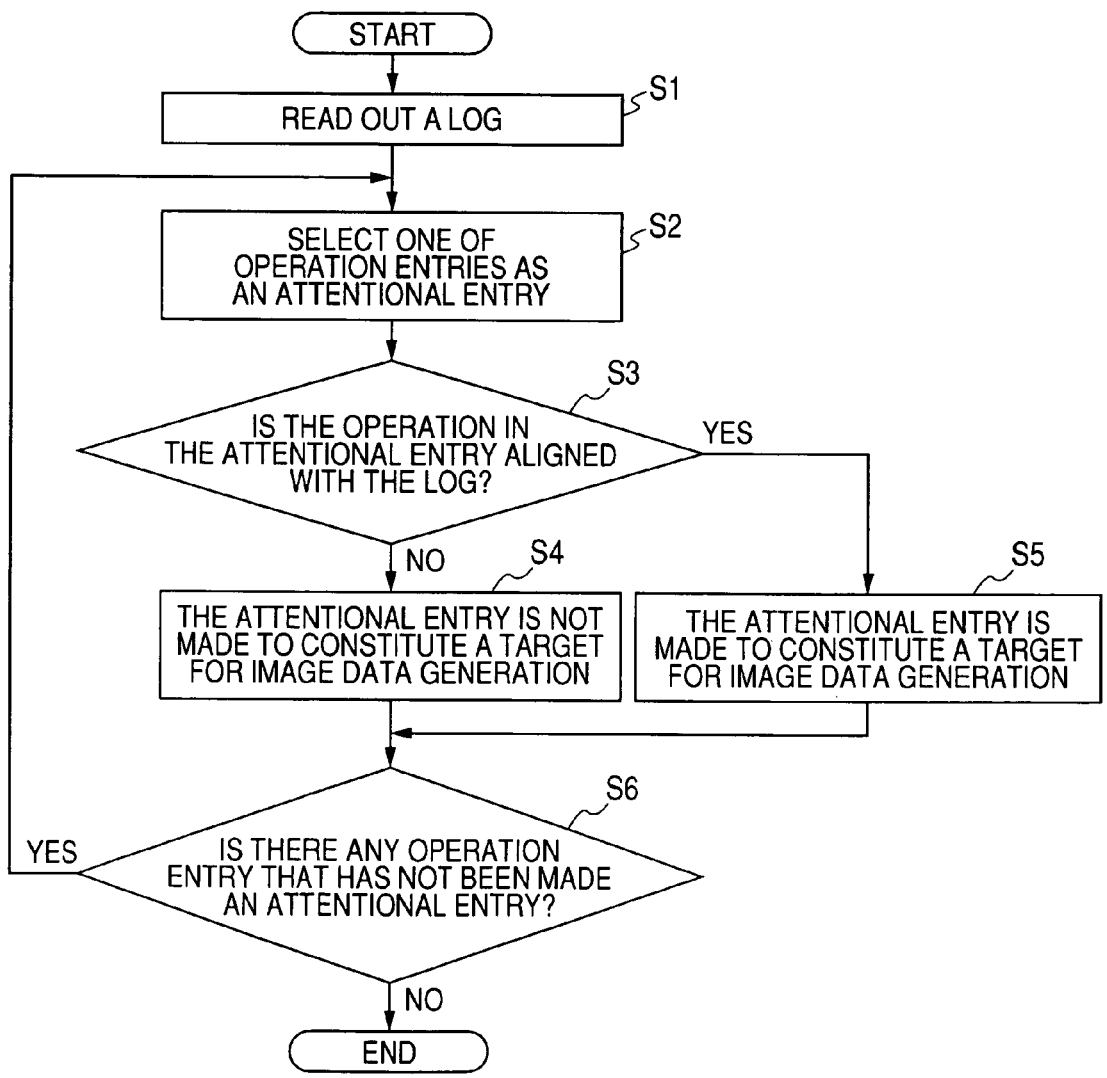
FIG. 6 is a flowchart depicting an example of part of the operation of the information processor according to the embodiment of the invention.

Next, an example of the operation of the record readout module 34 of the information processor 1 of the embodiment will be described. As is shown in FIG. 6, the record readout module 34 reads out the operation log which has been stored in the storage unit 22 by the operation accepting module 32 (S1). In addition, the record readout module 34 reads out the operation entries (E) which are contained in the pieces of operation history information stored by the operation recording module 33 one by one in the order of recording (S2).

The record readout module 34 refers to the setting related to the operation target item (the attentional operation target) which constitutes the target of operation in the operation entry (the attentional entry) of the pieces of information contained in the operation log.

Then, the record readout module 34 compares the result of the setting in the relevant attentional entry with the setting referred to from the operation log (S3). Following this, the record readout module 34 sets such that the attentional entry does not constitute a target for output when the setting in the attentional entry differs from the setting referred to from the operation log (S4). For example, a case is considered in which although an operation target item for a setting in which two original documents in which data is written on one side thereof are to be copied on to both sides of a single sheet ("one side/both sides setting") is operated in the attentional entry, so as to implement a setting of "from one side to both sides," a setting in the operation log remains in a mode "from one side to one side." In this case, since the intended setting was changed by the operation which followed the attentional entry, so as to make the setting of "from one side to one side" currently effective, the attentional entry is set such that the relevant entry does not constitute the target for output.

For example, assuming that the user performs the following operations after he or she has selected a "copy" from the initial screen:

(1) One side/Both sides Setting: "both sides→both sides" is pressed down;
(2) One side/Both sides Setting: "one side→both sides" is pressed down;
(3) "Applicable Copies Tab" is pressed down;
(4) "Leaflet Setting" is on;
(5) "Right-hand side Stitching" is on; and
(6) The operation is started, Operation entries which depict these respective operations are accumulated as pieces of operation history information.

On the other hand, in the operation log depicting the operations which were actually performed, the following operations are depicted as having been actually performed:

(1) "Copy" is on;
(2) "One side→Both sides" is on;
(3) "Leaflet Setting (Right-hand side stitching, center fold, no registration correction)" is on; and so forth.

As to the setting operations which are not compatible with each other in the operation entries contained in the pieces of operation history information, the record readout module 34 then selectively reads out the settings which coincide with the settings recorded in the operation log.

In the above case, "(1) One side/Both sides Setting: 'both sides→both sides' is pressed down" is not compatible with "(2) One side/Both sides Setting: 'One side→Both sides' is on." Then, when referring to the operation log, since there exists the operation record; "(2) 'One side→Both sides' is on," the operation entry which coincides with the record, that is, "(2) One side/Both sides Setting: 'One side→Both sides' is on" is selectively read out.

In addition, in this embodiment, not only the operations for function setting but also the operations for screen switching (which includes the aforesaid operation; "(3) 'Applicable Copies Tab' is pressed down") are recorded in the operation history information. Then, the record readout module 34 reads out pieces of operation history information on operations for a screen change or transition like this. Note that while the operations performed after the operation ("copy") to be performed was selected are described herein, the information processor 1 of this embodiment also records transition operations performed for transition from the initial screen to a screen for function setting, and the record readout module 34 also reads out pieces of operation history information for the operations performed for the screen change from the initial screen.

In addition, a default setting value for a function on which the user has not performed a setting change operation is also recorded in the operation log. No operation history information is generated for a record like this on which no setting change operation has been performed.

In addition, in the event that the setting in the attentional entry coincides with the setting referred to from the operation log, the record readout module 34 sets such that the attentional entry constitutes a target for output (S5). For example, let's consider a case where although an operation target item of the copy, "One side/Both sides setting," is operated so as to set a setting of "from one side to both sides" in the attentional entry, the setting in the operation log remains set to "One side to Both sides." In this case, since the setting is not changed by the following operation in the attentional entry, a setting is implemented so that the attentional entry constitutes a target for output.

The record readout module 34 investigates whether or not an operation entry which has not yet been made into an attentional entry is contained in the operation history information (S6), and if the operation entry is not included in the operation history information, then, the flow returns to the operation at S2 so as to continue the operation. In addition, in the event that no operation entry that has not yet been made into an attentional entry is determined to be contained in the operation history information in the operation at S6 (in the event that operations have been completed on all operation entries contained in the operation history information), the record readout module 34 outputs selectively operation entries that are set as targets for output to the reproduction screen generating module 35. By this operation by the record readout module 34, the operation entries related to a final setting condition are selectively extracted.

In addition, in place of the method which employs the operation log, the record readout module 34 may employ another method in which it investigates whether or not the operation in the attentional entry has been cancelled in an operation entry which has followed the attentional entry, and if the cancellation has been duly implemented, the record readout module 34 sets such that the attentional entry does not constitute a target for output, whereas if not, the record readout module 34 sets such that the attentional entry constitutes a target for output. Operation entries related to the final setting condition are selectively extracted in this way, as well. In the event that the operation which does not employ the operation log is performed, the operation log does not necessarily have to be recorded.

Note that in the description that has been made heretofore, the operation accepting module 32 may be made to output the contents of the following operations or the like to the operation recording module 33, provided that the user performs an operation to start recording operations. In case this is included in the configuration of the information processor 1, the contents of operations by the user are recorded when the operation is performed to start recording operations, and image data related thereto is generated. In addition, the operation accepting module 32 may instruct the operation screen display module 31 to restore the initial screen when the operation is performed to start recording operations. When receiving the instruction to restore the initial screen, the operation screen display module 31 displays a predetermined initial screen and puts the states of the respective operation target items contained in the initial screen into the default states which are set in the screen specifying information.

In addition, specific identifiers (processing identifiers) may be issued to processings based on the series of operations performed by the user. As this occurs, the processing identifiers are included in operation entries which depict the operations related to the respective processings.

Next, the operation of the information processor of the embodiment will be described. When the user instructs the information processor 1 to start recording operations, the control unit 21 thereof issues specific processing identifiers.

Then, the information processor 1 displays the predetermined initial screen on the display unit 24.

When the user calls the respective operation screens from the initial screen, operates operation target items contained in the respective operation screens and executes various operations, the contents of the operations are stored in the storage unit 22 as pieces of operation history information.

For example, the user starts to perform operations to set the "One side/Both sides setting" on a basic screen (referred to a screen identifier "1") of the copying operation which is the initial screen. Then, an interface program for accepting the "One side/Both sides setting" is activated, whereby an operation screen (referred to as a screen identifier "11") is provided by the interface program on which a group of radio buttons is arrayed, the radio buttons corresponding, respectively, to "from one side to one side," "from one side to both sides," "from both sides to one side," and "both sides to both sides."

The user presses down the "from one side to both sides" button from the group of radio buttons. Hereinafter, the user moves to an operation screen (referred to as a screen identifier "2") of the "applicable copies" and performs operations including an operation to select a button of "place four-page data in a single sheet" from a setting of "print N-page data on a single sheet in a reduced array".

The control unit 21 accumulates pieces of information depicting the operations of the respective operation screens. These pieces of information include item identifiers of operation target items that were operated, pieces of information which depict the contents of the operations performed and operation identifiers related to those pieces of information. The control unit 21 accumulates the pieces of operation history information in the storage unit 22 in this way, whereby pieces of operation history like one shown in FIG. 7 are stored in the storage unit 22.

Figure 8A:
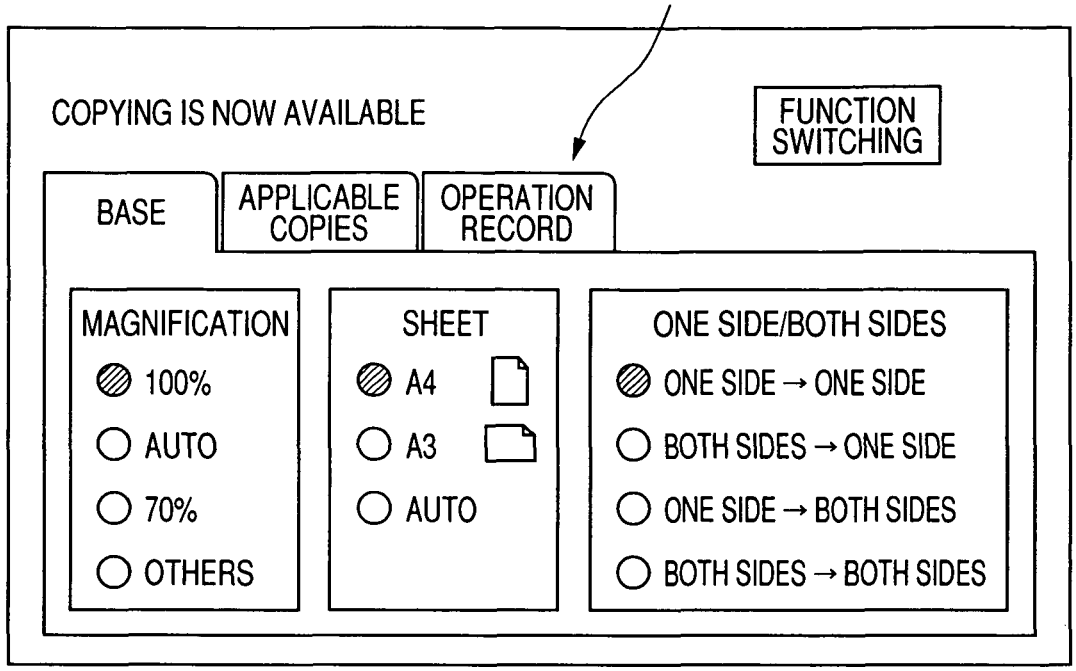
FIGS. 8A and 8B are explanatory drawings showing an example of an interface screen provided by the image processor according to the embodiment of the invention.
Figure 8B:
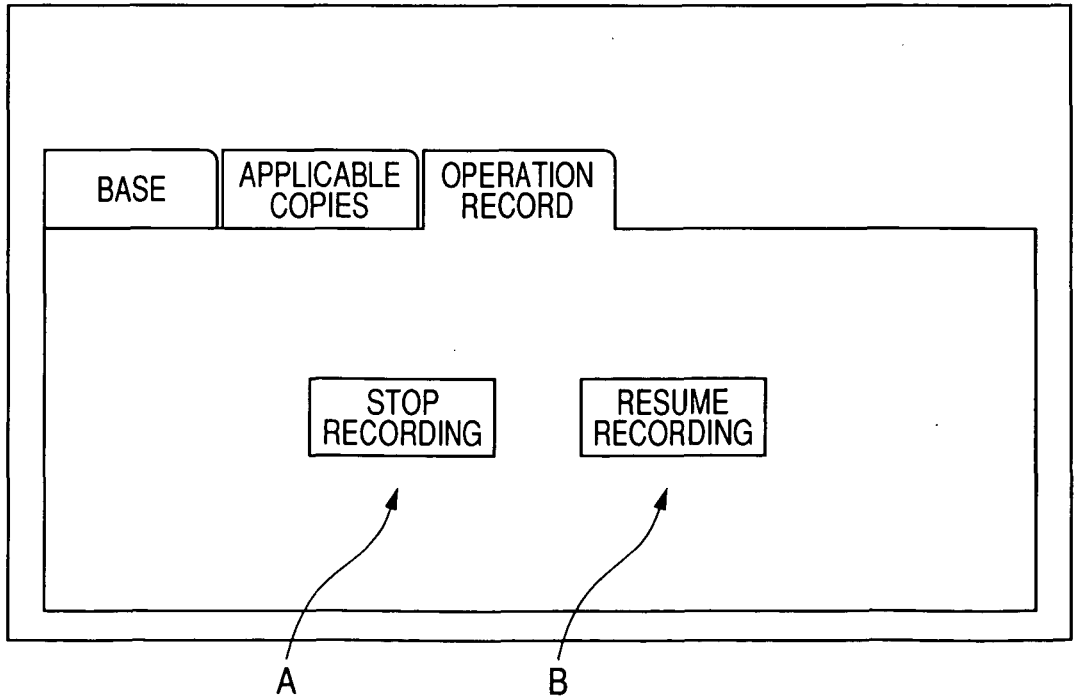

In addition, in operating these operations, operation buttons which enable the stop and resumption of recording the operation on the operation screen may be included. For example, as shown in FIG. 8(*a*), an "operation record" tab T may be provided, so that when the user presses down this tab, buttons A, B shown in FIG. 8(*b*) are displayed which enable the stop and resumption of recording the operation. When the stop of recording the operation is instructed here, the control unit 21 discards the piece of operation history information that has been stored until then in the storage unit 22. In addition, when the resumption button is operated, the control unit 21 understands that an instruction to start recording the operation has been issued again and resumes the operation from the display of the initial screen.

In addition, an operation is enabled in which the user becomes aware of an error in a preceding part of the operation which is being performed in the middle thereof, moves to the operation screen of the "Applicable Copies" and reselects a button of "place two-page data in a single sheet" from the setting of "print N-page data in a single sheet in a reduced array."

The control unit 21 also stores the operations performed as pieces of operation history information on this occasion. Namely, as shown in FIG. 7, in this piece of operation history information, a piece of information which depicts a state after the change in setting is stored together with the item identifier of the operation target item remaining the same (refer to E1, E2 in FIG. 7).

When the user presses down a button which instructs the start of copying, the control unit 21 starts an operation of copying based on the contents set by the operation of the user. In addition to this, the control unit 21 ends storing the operation history information. Here, the control unit 21 may be made to allow the user to select a destination of output of image data for operation screen which is generated based on the operation history information stored. As destinations of the output, for example, the printer section 30 (in the event that printing is carried out), the storage unit 22 (in the event that the data image is stored for use in later operations) and the like are raised.

The control unit 21 selects sequentially operation entries of the recorded pieces of operation history information in the order of recording as attentional entries and retrieves to see whether or not other operation entries in which the contents set in the attentional entries are changed are included in the following operation entries.

Taking the case of the operation history shown in FIG. 7(*b*) for example, initially, the "place four-page data in a single sheet" is set from the "print N-page data in a single sheet in reduced array" and thereafter, the setting is changed to the "place two-page data in a single sheet." Then, the control unit 21 selects the operation entries except for this preceding operation entry (the entry made when setting the "place four-page data in a single sheet") Then, the control unit 21 generates operation screen image data regarding the operation entries so selected.

As a specific example, in the operation history information shown in FIG. 7(*b*), since the operation entries related to the operations on the screen identifier "1" (the basic screen of copying in this example) are included as the selected operation entries, the control unit 21 reads out information necessary to draw an operation screen related to the screen identifier "1" from the screen specifying information.

The control unit 21 generates operation screen image data which relates to the basic operations of copying based on the screen specifying information so read out. Since a piece of information to the effect that the button to enable the operation of "One side/Both sides setting" is included in the operation entries made here, the control unit 21 refers to the rectangular information which depicts a region where the button of "One side/Both sides setting" from the screen specifying information and draws a graphic C which is circumscribed about a rectangular which is defined by the rectangular information by combining the rectangular information so referred to with the image data generated. As a result of this, image data to be generated becomes one such as shown in FIG. 9(*a*).

Furthermore, following this, the control unit 21 reads out information necessary to draw an operation screen (an operation screen on which the group of radio buttons which depict the selection items related to the "One side/Both sides setting" is displayed) that is provided by an interface program started to in the operation described above, that is, an operation screen related to a screen identifier "11" from the screen specifying information. The control unit 21 generates image data for the operation screen that is provided by the interface program based on the screen specifying information so read-out. Furthermore, since a piece of information to the effect that the button depicting "from one side to both sides" has been operated from those radio buttons, the control unit 21 draws a graphic which surrounds the button of "from one side to both sides," whereby a screen like one illustrated in FIG. 9(*b*) is drawn.

In addition, following this, the control unit 21 locates an operation for calling the operation screen of applicable copies on the operation screen (the screen identifier "1") of the basic operations. Then, the control unit 21 reads out information necessary to draw an operation screen related to the screen identifier "1" from the screen specifying information. In addition, the control unit 21 generates image data for an operation screen related to the basic operations of copying based on the screen specifying information so read out. Since an operation to call the operation screen of applicable copies is performed here, the control unit 21 draws a graphic which surrounds the "applicable copies" tab, whereby a screen illustrated in FIG. 9(*c*) is drawn.

Furthermore, the control unit 21 locates the operation entry related to the operation on the operation screen (the screen identifier "2") of "applicable copies." In this operation entry, the operation of "place two-page data in a single sheet" is performed. The control unit 21 reads out information necessary to draw an operation screen related to the screen identifier "2" from the screen specifying information. Then, the control unit 21 generates image data for the operation screen related to the applicable copies of the copying based on the screen specifying information so read out.

Furthermore, by referring to rectangular information which depicts a region where the button of "place two-page data in a single sheet" is disposed from the screen specifying information, the control unit 21 draws a graphic which is circumscribed about a rectangular which is defined by the rectangular information (FIG. 9(*d*)).

In this way, the control unit 21 generates to output image data which depicts the respective operation stages shown in FIGS. 9(*a*) to (*d*) from the information which describes the records of operations and operation screens. The image data at the respective operation stages may be preserved in the storage unit 22 or the like as image data in the form of, for example, JPEG (Joint Picture Experts Group). In addition, the image data may be outputted in the form of print at the printer section 30.

Furthermore, the control unit 21 may combine sequence codes (sequence numbers) with part of the image data so generated. In addition, while the example has been described here in which image data is generated individually at each operation stage, one piece of image data may be generated in which pieces of image data at a plurality of operation stages are arrayed.

Furthermore, in the event that the operation identifier is included in the operation entry, when reproducing the operation screen, the control unit 21 may be made to receive the designation of an operation identifier from the user and read out selectively an operation entry related to the operation identifier so designated, so as to perform a reproducing operation of the operation screen.

Similarly, the control unit 21 may be made to receive the designation of a screen identifier or an item identifier from the user and read out selectively an operation identifier related to the operation of the screen identifier or the item identifier so designated by the user, so as to perform a reproducing operation of the operation screen.

In addition, when generating an operation entry, respective set values at the point in time may be included to be recorded in the operation entry so as to be made use of when reproducing an operation screen. In this way, an operation screen in which the contents of the settings that have been made until then are reflected may be reproduced.

Figure 9A:
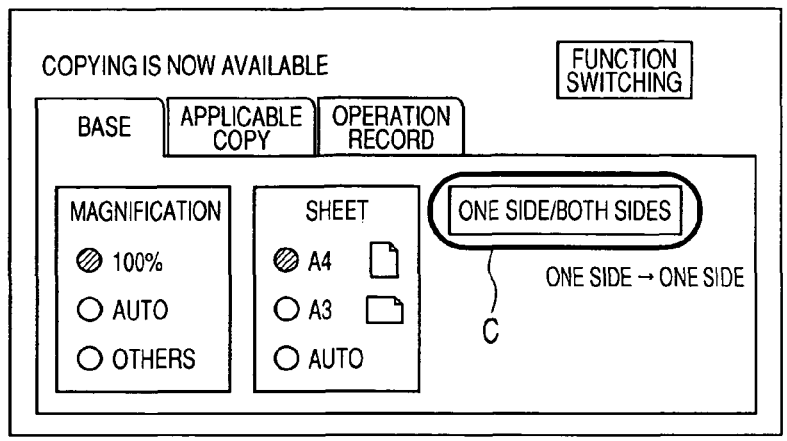
FIGS. 9A to 9D are explanatory drawings depicting an example of image data that is generated by the image processor according to the embodiment of the invention.
Figure 9B:
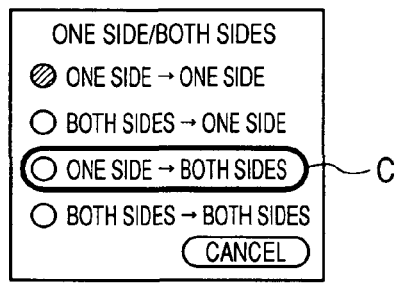
Figure 9C:
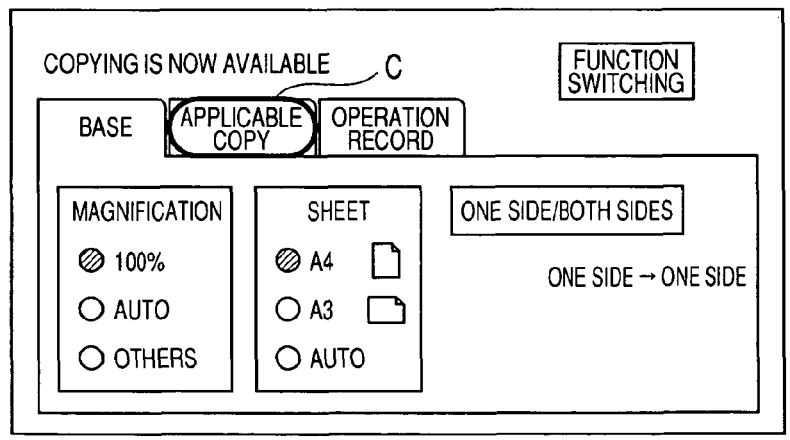
Figure 9D:
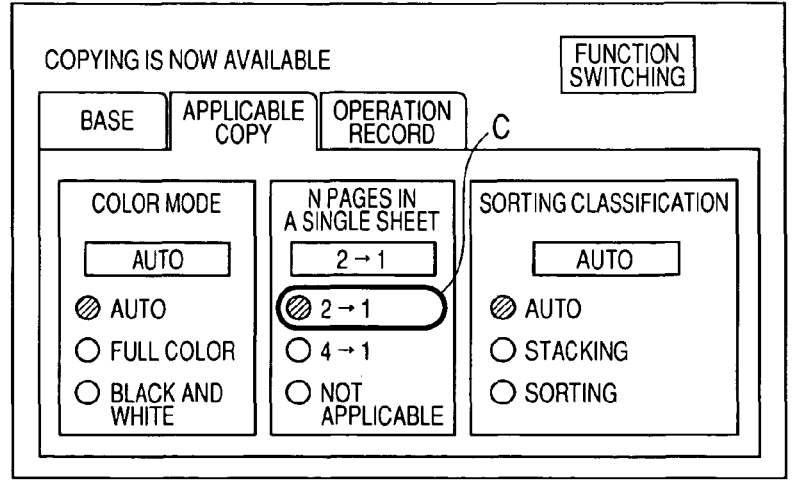

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.
FIG. 9D
A Color mode
   auto
   auto
   full color
   black and white
B N pages in a single sheet
   2→1
   2→1
   4→1
   not applicable
C Sorting classification
   auto
   auto
   stacking
   sorting
FIG. 7
A Operation screen identifier=1
   item identifier=11000 "one side/both sides"
   setting="One side→Both sides"
   operation identifier=aaaa
B Operation screen identifier=1
   item identifier=11002 "applicable copies"
   setting=one
   operation identifier=aaaa
C Operation screen identifier=2
   item identifier=22000 "N pages in a single sheet"
   setting="four pages single sheet"
   operation identifier=aaaa
D Operation screen identifier=2
   item identifier=22000 "N pages in a single sheet"
   setting="two pages→single sheet"
   operation identifier=aaaa
FIG. 6
S1 read out a log
S2 select one of operation entries as an attentional entry
S3 Is the operation in the attentional entry aligned with the log?
S4 the attentional entry is not made to constitute a target for image data generation
S5 the attentional entry is made to constitute a target for image data generation
S6 Is there any operation entry that has not been made an attentional entry?
FIG. 4B
A Identifiers
B designation
   copy
   one side/both sides
C coordinate information
D types
   tab
   radio button group;
E Default
   On
   "One side→One side"
FIG. 1
21 control unit
22 storage unit
23 operation unit
24 display unit
25 FAX communication unit
26 communication unit
27 interface unit FIG. 8A
A Magnification
   100%
   auto
   70%
   others
B Sheet
   A4
   A3
   Auto
C One side/Both sides
   one side→one side
   both sides→one side
   one side→both sides
   both sides→both sides
FIG. 9A
A Magnification
   100%
   auto
   others
B Sheet
   A4
   A3
   auto
FIG. 9B
A One side/Both sides
B one side→one side
   both sides→one side
   one side→both sides
   both sides→both sides
   cancel
FIG. 9C
A Magnification
   100%
   auto
   others
B Sheet
   A4
   A3
   auto

What is claimed is:

1. An information processing apparatus comprising:
a display unit that displays a screen including at least one operation target item constituting a target of an operation;
a recording unit that records pieces of information depicting operations performed by a user on operation target items displayed on the display unit as pieces of operation history information; and
a screen reproducing unit reproduces the screen displayed while the operation was performed by the user, on the basis of the piece of operation history information recorded in the recording unit; and
a reproduction screen processing unit that performs an operation for realizing a form in which operation target items on which operations were performed are distinguished from operation target items on which operations were not performed by providing a graphic which is circumscribed about the operation target in the screen reproduced by the screen reproducing unit, wherein
the screen reproduced by the screen reproducing unit is displayed with the operation target item which was designated to implement a function of the operation by the user while the operation was performed, and the at least one operation target item is displayed having not been designated to implement the function of the operation and being different from other operation target items.

2. The information processing apparatus as claimed in claim 1, wherein the screen reproducing unit selectively extracts the pieces of information depicting the operations satisfying a predetermined condition from the pieces of operation history information recorded in the recording unit, and reproduces the screens displayed at the points in time at which the operations depicted by the respective pieces of the extracted operation history information.

3. The information processing apparatus as claimed in claim 2, wherein the recording unit records a series of operations performed by the user, and the screen reproducing unit selectively extracts a piece of operation history information, which satisfies a condition that the operation depicted by the piece of operation history information is not cancelled by an operation following the operation, from pieces of operation history information depicting the series of operations performed by the user.

4. The information processing apparatus as claimed in claim 1, further comprising:

a reproduction screen processing unit that performs an operation for realizing a form in which operation target items on which operations were performed can be distinguished from operation target items on which operations are still not performed in a screen reproduced by the screen reproducing unit.

5. The information processing apparatus as claimed in claim 2, wherein the recording unit records a specific process identifier each time a processing is performed as a result of an operation by the user so that the specific process identifier is included in a piece of information depicting the operation, and the predetermined condition comprises a condition that operation history information relates to a process identifier designated by the user.

6. The information processing apparatus as claimed in claim 2, wherein the predetermined condition comprises a condition relating to one of the screens on which the operations were performed and the contents of the operations.

7. The information processing apparatus as claimed in claim 1 wherein the recording unit records an operation performed by the user in a case where the screen of the display unit is changed from an initial screen displayed when the information processing apparatus is started to operate to a screen accepting an operation by the user, and the screen reproducing unit reproduces a screen displayed at a point in time at which the operation was performed by the user in a case where the screen of the display unit is changed from an initial screen displayed when the information processing apparatus is started to operate to a screen accepting an operation by the user.

8. The information processing apparatus as claimed in claim 1, wherein the recording unit records an operation performed by the user in a case where a plurality of screens accepting an operation by the user exist and screens to be displayed are changed between the plurality of screens, and the screen reproducing unit reproduces a screen displayed at a point in time at which the operation was performed by the user in a case where the screens to be displayed are changed.

9. An information processing method comprising:

displaying a screen that includes at least one operation target item constituting a target of an operation;

recording pieces of information that depict operations performed by a user on displayed operation target items as pieces of operation history information; and reproducing the screen displayed while the operation was performed by the user, on the basis of the piece of operation history information recorded; and providing a graphic circumscribed about the operation target in the reproduced screen so as to distinguish operation target items on which operations were performed from operation target items on which operations were not performed, wherein the reproduced screen is displayed with the operation target item which was designated to implement a function of the operation by the user while the operation was performed, and the at least one operation target item is displayed having not been designated to implement the function of the operation and being different from other operation target items.

10. A non-transitory computer readable medium storing a program causing, a computer to execute a process for performing an information processing, the process comprising:

displaying a screen that includes at least one operation target item constituting a target of an operation;

recording pieces of information that depict operations performed by a user on displayed operation target items as pieces of operation history information; and reproducing the screen displayed while the operation was performed by the user, on the basis of the piece of operation history information recorded; and providing a graphic circumscribed about the operation target in the reproduced screen so as to distinguish operation target items on which operations were performed from operation target items on which operations were not performed, wherein the reproduced screen is displayed with the operation target item which was designated to implement a function of the operation by the user while the operation was performed, and the at least one operation target item is displayed having not been designated to implement the function of the operation and being different from other operation target items.

* * * * *